(12) United States Patent
de Mevergnies et al.

(10) Patent No.: US 7,831,777 B2
(45) Date of Patent: Nov. 9, 2010

(54) APPARATUS AND METHOD FOR REDUCING INFORMATION LEAKAGE BETWEEN PROCESSES SHARING A CACHE

(76) Inventors: Michael Neve de Mevergnies, 11835 SW. Center St., Apt. 110, Beaverton, OR (US) 97005; Jean-Pierre Seifert, Brunnenhof, Dorf 132, A-6574 Pettneu Am Arlberg (AT)

( * ) Notice: Subject to any disclaimer, the term of this patent is extended or adjusted under 35 U.S.C. 154(b) by 225 days.

(21) Appl. No.: 11/442,229

(22) Filed: May 26, 2006

(65) Prior Publication Data

US 2007/0277001 A1    Nov. 29, 2007

(51) Int. Cl.
*G06F 13/14* (2006.01)
(52) U.S. Cl. .................... 711/145; 711/130; 711/141; 711/156
(58) Field of Classification Search ............ 711/145, 711/130, 141, 156
See application file for complete search history.

(56) References Cited

U.S. PATENT DOCUMENTS

| | | | | |
|---|---|---|---|---|
| 5,845,331 A | * | 12/1998 | Carter et al. | 711/163 |
| 6,216,199 B1 | * | 4/2001 | DeKoning et al. | 711/3 |
| 2002/0080190 A1 | * | 6/2002 | Hamann et al. | 345/810 |

* cited by examiner

*Primary Examiner*—Sanjiv Shah
*Assistant Examiner*—Jae U Yu
(74) *Attorney, Agent, or Firm*—Thomas R. Lane

(57) ABSTRACT

Apparatus and methods for reducing information leakage between processes sharing a cache are disclosed. In one embodiment, an apparatus includes execution logic, a cache memory, and cache security logic. The execution unit is to execute a plurality of processes. The cache memory is to be shared between the plurality of processes. The cache security logic is to cause a stored cache state to be loaded into the cache memory.

12 Claims, 2 Drawing Sheets

APPARATUS AND METHOD FOR REDUCING INFORMATION LEAKAGE BETWEEN PROCESSES SHARING A CACHE

BACKGROUND

1. Field

The present disclosure pertains to the field of information processing, and, more specifically, to the field of information processing security.

2. Description of Related Art

In many information processing systems, two or more separate processes may share a single cache. In a first example, two processes may alternately be executed on a single processor having a single cache. In a second example, a processor may have a feature that allows the concurrent execution of multiple processes, with instruction-level interleaving and parallelism, and each of these multiple processes may use the processor's cache. Such situations present the possibility of information leakage between processes, making these systems vulnerable to security problems.

For example, where two processes share a single cache, a first process may be able to discover secret information about a second process by monitoring its own execution time to reveal cache misses. These cache misses may reveal information about the memory access patterns of the second process, because the cache misses may indicate whether or not the second process is evicting specific cache entries of the first process. If the cache is direct-mapped or set-associative, then the knowledge of which cache entries are being evicted may be used to gather information about which memory locations the second process is using. When the second process is using table-based lookup to perform encryption or decryption with a cryptographic key, its memory access patterns may reveal which table entries it is using. Through cryptanalysis, the value of the key may be determined based on the knowledge of which table entries are being used.

BRIEF DESCRIPTION OF THE FIGURES

The present invention is illustrated by way of example and not limitation in the accompanying figures.

DETAILED DESCRIPTION

The following description describes embodiments of techniques for reducing information leakage between processes sharing a cache memory. In the following description, some specific details, such as processor and system configurations, are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for reducing information leakage between processes sharing a cache memory. Techniques according to embodiments of the present invention may be used to decrease the vulnerability of an information processing system to attacks based on leakage of memory access information.

Figure 1:
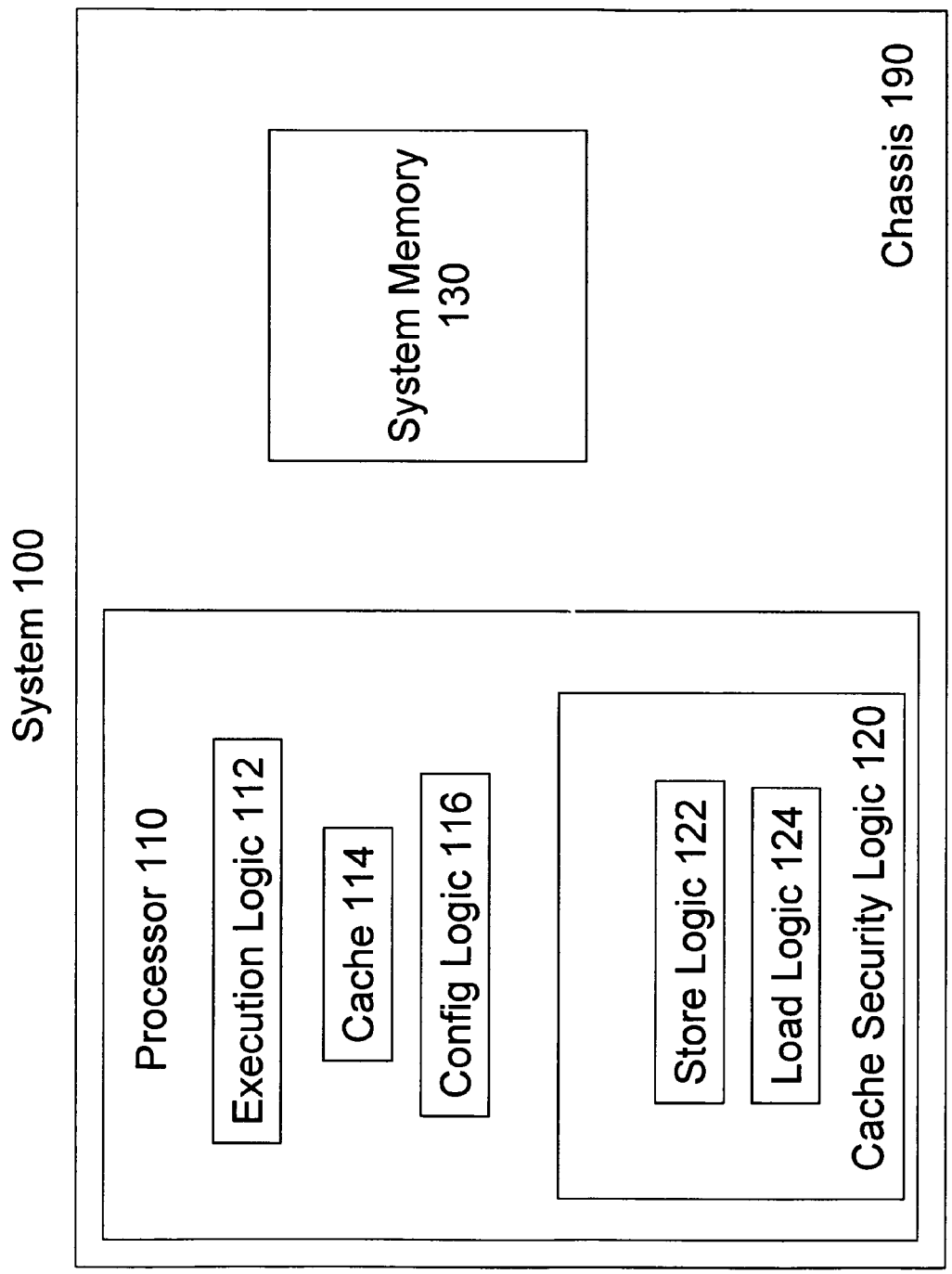
FIG. 1 illustrates an embodiment of the invention in a processor including cache security logic, and in a system including a processor having cache security logic.

FIG. 1 illustrates an embodiment of the invention in a processor, processor 110, including cache security logic 120. Processor 110 is shown in system 100, which also includes system memory 130.

Processor 110 may be any of a variety of different types of processors, such as a processor in the Pentium® Processor Family, the Itanium® Processor Family, or other processor family from Intel Corporation, or any other general purpose or other processor from another company. In the embodiment of FIG. 1, processor 110 includes execution logic 112, cache memory 114, and configuration logic 116.

Execution logic 112 may include one or more execution cores, where each execution core includes logic for executing instructions. Execution logic 112 is designed to execute multiple processes or threads, where each process or thread includes a sequence of instructions. Some of these instructions may directly or indirectly reference a memory location in system memory 130. The multiple processes or threads may be executed by execution logic 112 according to any known approach, such as an approach in which an operating system swaps processes on and off of one execution core using a time-sharing protocol, an approach in which separate processes run on separate execution cores, an approach in which separate processes run concurrently on one or more execution cores on a processor that includes hardware to support instruction-level parallelism and interleaving, or an approach using any combination of such approaches. Any process being executed by execution logic 112 may be described as running on processor 110.

When an instruction in a process running on processor 110 references a memory location in system memory 130, the data stored in that memory location may also be stored in cache memory 114. Cache memory 114 may be any known type of cache memory, such as a set-associative level one cache memory. Cache memory 114 is shared by the multiple processes running on processor 110, in that data from a memory location referenced by an instruction in any such process may be stored in cache memory 114. Therefore, any process running on processor 110 may access cache memory 114. In the event that the set-associative property of cache 114 results in a first memory location referenced by an instruction in a first process being loaded into the same cache line or entry that corresponds to a second memory location referenced by an instruction in a second process, running one process on processor 110 may result in the eviction of data that was loaded into cache memory 114 on behalf of another process running on processor 110.

Figure 2:
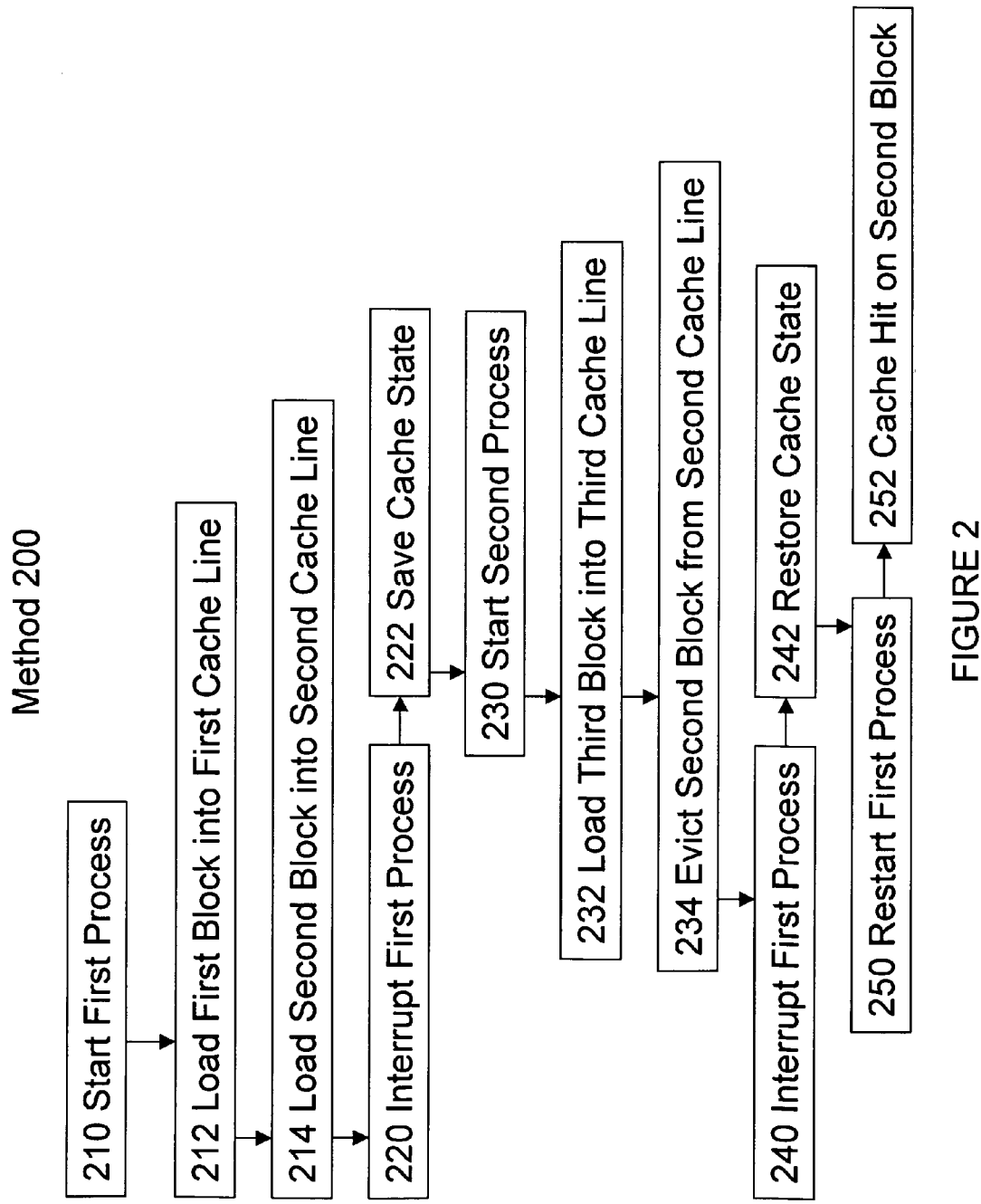
FIG. 2 illustrates an embodiment of the invention in a method for reducing information leakage between processes sharing a cache memory.

Cache security logic 120 includes store logic 122 and load logic 124. Store logic 122 is to cause a cache state to be stored in any storage location in system 100, such as system memory 130. Load logic 124 is to cause a stored cache state to be loaded into cache 114. Cache security logic 120, including store logic 122 and load logic 124, may be any type of circuitry or other logic to perform according to a method embodiment of the present invention. One such method embodiment is illustrated in FIG. 2. In FIG. 2, method 200 is a method for reducing information leakage between processes sharing a cache memory.

In box 210 of FIG. 2, a first process begins to run, or continues to run, on a processor, such as processor 110 as described above. In box 212, the execution of an instruction of the first process causes a first block of data from a system memory, such as system memory 130, to be loaded into a first line of a cache memory, such as cache memory 114. In box 214, the execution of another instruction of the first process causes a second block of data to be loaded into a second line of the cache memory.

In box 220, the first process is interrupted, or the processor receives some indication that the first process is to be interrupted. In box 222, cache security logic, such as cache security logic 120, causes the state of the cache memory to be stored. The cache state is stored in connection with the interruption of the first process, in other words, as a result of the interruption, as a result of the processor receiving an indication that the first process is to be interrupted, or as a result of any indication of the occurrence of the interrupt, whether or not the interrupt has been or is being requested, acknowledged, held pending, etc. The state of the cache memory that is stored is the state of the cache memory at the point in the instruction flow where the first process is interrupted or is to be interrupted, such that by reloading the stored cache state into the cache memory, the contents of the cache memory will be the same as the contents of the cache memory at the point in the instruction flow where the first process was interrupted. Therefore, assuming that the first block of data loaded into the first cache line in box 212 and the second block of data loaded into the second cache line in box 214 have not been evicted by or on behalf of the first process, at least these two blocks will be included in the stored cache state. The cache state may be stored, or saved, in any storage location accessible by the processor, such as a system memory. In one embodiment, the cache state is stored in a repeatable amount of time that does not vary based on the contents of the cache or the number of cache lines filled on behalf of any process.

In box 230, a second process begins to run, or continues to run, on the processor. In box 232, the execution of an instruction of the second process causes a third block of data to be loaded into a third line of the cache memory, where the third line has not been filled by the first process. In box 234, the execution of another instruction of the second process causes a fourth block of data from the system memory to be loaded into a second line of the cache memory, causing the second block of data to be evicted, for example, due to the set-associative property of the cache memory.

In box 240, the second process is interrupted, or the processor receives some indication that the second process is to be interrupted, so that the first process may continue, as described below with respect to box 250.

In box 242, the cache security logic causes the state of the cache memory that was stored in box 222 to be loaded into the cache memory, such that the contents of the cache memory at the point in the instruction flow where the first process was interrupted are restored. Therefore, the second block of data, which was evicted in box 234, is reloaded into the cache. The stored cache state is reloaded in connection with the continuing the execution of the first process, as described below with reference to box 250, in other words, as a result of the interruption of the second process to continue the first process, as a result of the processor receiving an indication that the second process is to be interrupted, or as a result of any indication of the occurrence of the interrupt, whether or not the interrupt has been or is being requested, acknowledged, held pending, etc. In one embodiment, the stored cache state is reloaded in a repeatable amount of time that does not vary based on the contents of the cache, the contents of stored cache state, the number of cache lines that were filled on behalf of any process, the number of cache lines of the stored cache state that were filled on behalf of any process, any correlation or lack of correlation between any of the foregoing, or any other such factor.

In box 250, the first process continues running. In box 252, the execution of an instruction of the first process references a location in system memory corresponding to the second block of data, causing an access to the cache memory, i.e., a cache hit instead of a cache miss, because the second block of data is in the cache as a result of the actions taken in box 242. Therefore, monitoring the execution time of the first process would not reveal that the second block of data was evicted in box 234, a memory access pattern of the second process may be hidden, and the availability of information, about the second process to the first process, may be reduced. For example, the second process may use a table-based lookup to perform encryption or decryption with a secret key without its memory access patterns being revealed.

Within the scope of the present invention, method 200 may be performed in a different order, with illustrated boxes performed simultaneously, with illustrated boxes omitted, with additional boxes added, or with a combination of reordered, combined, omitted, or additional boxes. Also, the details associated with each box may vary within the scope of the present invention. As one example of such variation, in box 230, the second process may begin to run on a different processor than the processor that the first process had been running on, so long as the second process has access to the same cache memory to which the first process had access. As another example of such variation, the instruction referred to with respect to box 214 may be the same instruction referred to with respect to box 212. Many other variations, such as those corresponding to the execution of additional processes, are possible.

Returning to FIG. 1, configuration logic 116 may include logic to selectively enable cache security logic 120. For example, configuration logic 116 may enable cache security logic 120 on a process-by-process basis. In one embodiment, configuration logic 116 may include a first indicator, such as a programmable enable bit, to enable cache security logic 120 to store the cache state of a first process when it is interrupted, a second indicator to enable cache security logic 120 to store the cache state of a second process when it is interrupted, and any number of additional indicators to enable cache security logic 120 for any other processes. In another embodiment, configuration logic 116 may include a first indicator to enable cache security logic 120 to store the cache state of any process interrupted by a first process so that it may be restored when the first process is later interrupted by that process, a second indicator to enable cache security logic 120 to store the cache state of any process interrupted by a second process so that it may be restored when the second process is later interrupted by that process, and any number of additional indicators to enable cache security logic 120 for any other processes. Configuration logic 116 may be implemented in hardware (such as programmable configuration registers), firmware (such as a processor abstraction layer), software (such as an operating system or virtual machine monitor), or any combination of hardware, firmware, and software.

Therefore, cache security logic 120 may be enabled as desired to protect processes that may otherwise be susceptible to attack, such as processes performing encryption using secret keys, and disabled when not desired, in order to minimize any performance impact.

System memory 130 may include any type of data or information storage medium, such as static or dynamic random access memory, semiconductor-based read only or flash memory, magnetic or optical disk memory, or any other type of medium accessible by processor 110, or any combination of such media. System memory 130 may be coupled to processor 110 through any type of bus, point to point, or other connection, directly or through any other component, such as a chipset or a bus bridge or controller.

The embodiment of FIG. 1 shows processor 110 and system memory 130 contained together within mobile chassis 190, however, embodiments within any other type of container, housing, or other structure, including embodiments where processor 110 and system memory 130 are in separate containers or structures, and embodiments where processor 110 and/or system memory 130 are self-contained and/or are not contained within another structure may be possible.

Within the scope of the present invention, processor 110 may include any other circuitry, units, logic or other elements not illustrated or described, and system 100 may include any other components, connections, or other elements not illustrated or described. For example, system 100 may include additional processors, identical to or different from processor 110, and such processors may or may not include their own caches and/or cache security logic. A single cache security logic element may be enabled for multiple processes running on different processors, so long as the processes share a common cache memory.

Processor 110, or any other processor or component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for reducing information leakage between processes sharing a cache memory have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    execution logic to execute a plurality of processes;
    a cache memory to be shared between the plurality of processes; and
    cache security logic to reduce information leakage between the plurality of processes, including store logic to cause the cache state of a first of the plurality of processes to be stored in response to an interruption of the first process, wherein the cache state to be stored is to restore the contents of the cache memory to be the same as at the point in the instruction flow where the first process was interrupted and wherein the amount of time to store the cache state does not vary based on the contents of the cache memory, and load logic to cause the stored cache state to be loaded in connection with continuing the execution of the first of the plurality of processes, such that the contents of the cache memory are the same as the contents of the cache memory at the point in the instruction flow where the first process was interrupted.

2. The apparatus of claim 1, wherein the cache security logic is also to reduce the availability of information about a second of the plurality of process to the first of the plurality of processes.

3. The apparatus of claim 2, wherein the cache security logic is to reduce the availability of information by hiding a memory access pattern of the second process.

4. The apparatus of claim 2, wherein the cache security logic is also to reduce the availability of information about a cryptographic key used by the second process.

5. The apparatus of claim 2, wherein the load logic is also to cause the stored cache state to be loaded in connection with an interruption of the second process by the first process.

6. The apparatus of claim 1, further comprising configuration logic to enable the cache security logic.

7. The apparatus of claim 2, further comprising configuration logic including:
    a first indicator to enable the cache security logic for the first process; and
    a second indicator to enable the cache security logic for the second process.

8. A method comprising:
    running a plurality of processes on a processor having a cache memory;
    interrupting a first of the plurality of processes to run a second of the plurality of processes;
    storing the cache state of the first process to generate a stored cache state, wherein the stored cache state is to restore the contents of the cache memory to be the same as at the point in the instruction flow where the first process was interrupted and wherein the amount of time to store the cache state does not vary based on the contents of the cache memory;
    interrupting the second process to continue running the first process; and
    causing the stored cache state to be loaded into the cache memory such that the contents of the cache memory are the same as the contents of the cache memory at the point in the instruction flow where the first process was interrupted, to reduce information leakage from the cache memory to the first of the plurality of processes.

9. The method of claim 8, wherein reducing information leakage also includes reducing information leakage about the second process.

10. The method of claim 8, wherein causing the stored cache state to be loaded includes causing the stored cache state to be loaded before continuing to run the first process.

11. A system comprising:
   a system memory; and
   a processor coupled to the memory, including:
      execution logic to execute a plurality of processes;
      a cache memory to be shared between the plurality of processes to cache data from the system memory; and
      cache security logic to reduce information leakage between the plurality of processes, including store logic to cause the cache state of a first of the plurality of processes to be stored in response to an interruption of the first process, wherein the cache state to be stored is to restore the contents of the cache memory to be the same as at the point in the instruction flow where the first process was interrupted and wherein the amount of time to store the cache state does not vary based on the contents of the cache memory, and load logic to cause the stored cache state to be loaded in connection with continuing the execution of the first of the plurality of processes, such that the contents of the cache memory are the same as the contents of the cache memory at the point in the instruction flow where the first process was interrupted.

12. The system of claim 11, wherein the system memory and the processor are contained in a mobile chassis.

* * * * *